United States Patent [19]

Smith et al.

[11] E Re. 29,131

[45] Reissued Feb. 1, 1977

[54] RADIATION-CURABLE ACRYLATE-CAPPED POLYCAPROLACTONE COMPOSITIONS

[75] Inventors: Oliver Wendell Smith, South Charleston, W. Va.; James Edward Weigel, White Plains, N.Y.; David John Trecker, South Charleston, W. Va.

[73] Assignee: Union Carbide Corporation, New York, N.Y.

[22] Filed: June 24, 1976

[21] Appl. No.: 699,471

Related U.S. Patent Documents

Reissue of:

[64] Patent No.: 3,700,643
Issued: Oct. 24, 1972
Appl. No.: 69,127
Filed: Sept. 2, 1970

U.S. Applications:

[63] Continuation-in-part of Ser. No. 6,918, Jan. 29, 1970, abandoned.

[52] U.S. Cl. ..... 260/77.5 AN; 204/159.14; 204/159.15; 204/159.16; 204/159.19; 260/46.5 E; 260/67 TN; 260/78.3 R; 260/827; 260/859 R

[51] Int. Cl.[2] ..... C08G 22/16; C08G 17/02; C08G 41/04

[58] Field of Search ..... 260/67, 78.3 R, 77.5 AN

[56] References Cited

UNITED STATES PATENTS

| | | | |
|---|---|---|---|
| 3,297,745 | 1/1967 | Fekete et al. | 260/471 |
| 3,509,234 | 4/1970 | Burlant et al. | 260/859 |
| 3,553,174 | 1/1971 | Hausslein et al. | 260/77.5 |
| 3,553,249 | 1/1971 | Brotherton et al. | 260/468 |
| 3,554,886 | 1/1971 | Colomb et al. | 204/159.12 |

FOREIGN PATENTS OR APPLICATIONS

| | | |
|---|---|---|
| 619,925 | | Belgium |
| 693,267 | 7/1967 | Belgium |
| 694,782 | 7/1967 | Belgium |
| 639,619 | 4/1962 | Canada |
| 1,505,416 | 12/1967 | France |

*Primary Examiner*—H.S. Cockeram
*Attorney, Agent, or Firm*—Francis M. Fazio

[57] ABSTRACT

Unsaturated acrylate-capped polycaprolactone polyol derivatives are produced having terminal acrylyl groups and at least one polycaprolactone polyol chain residue in the molecule. In one of its simplest forms the final product can be the reaction product of a polycaprolactone diol an organic isocyanate and hydroxyethyl acrylate. These novel derivatives can be used to produce novel coating compositions that are readily cured to solid protective films.

9 Claims, No Drawings

RADIATION-CURABLE ACRYLATE-CAPPED POLYCAPROLACTONE COMPOSITIONS

Matter enclosed in heavy brackets [ ] appears in the original patent but forms no part of this reissue specification; matter printed in italics indicates the additions made by reissue.

This application is a continuation-in-part of Ser. No. 6,918, filed Jan. 29, 1970, now abandoned.

BACKGROUND OF THE INVENTION

Many useful coating compositions are known in commerce. However, it is always desirable to obtain new compositions which will rapidly produce tough, durable, protective coatings without releasing excessive amounts of volatile vapors to the surrounding atmosphere. Recent accomplishments have produced so-called 100 percent solids coating compositions which are, in essence, reactive compositions that are essentially free of volatile solvents and contain diluent molecules that react during the curing process to become a part of the protective coating itself. Many such compositions are known to those skilled in the art and the term 100 percent solids coating composition is used to denote them. These known compositions, however, are often too viscous or do not cure rapidly enough for some commercial applications.

SUMMARY OF THE INVENTION

It has been found that polycaprolactone polyols, as hereinafter defined, that contain at least one free hydroxyl group will react with acrylic acid or hydroxyalkyl acrylates to produce an acrylate-capped polycaprolactone derivative. It has also been found that an organic polyisocyanate can be reacted with an hydroxyalkyl acrylate and a polycaprolactone polyol to produce an acrylate-capped polycaprolactone urethane. Similarly, a silicon-containing compound can be reacted to produce an acrylate-capped polycaprolactone silicone derivative.

It has also been found that the acrylate-capped polycaprolactone compounds can be used per se as coating compositions or they can be admixed with other compounds to produce coating compositions. As is obvious, any of the known pigments, fillers, additives, etc., ordinarily used in the production of coating compositions can be present. The coating compositions can be applied to a surface by any convenional manner and cured by the usual curing processes.

DETAILED DESCRIPTION OF THE INVENTION (1) The acrylate-capped polycaprolactone compounds The acrylate-capped polycaprolactone compounds can be defined by the following formulas:

I $$(CH_2{=}\underset{\underset{Z}{|}}{C}COO)_x{-}Q$$

IIA $$(OH_z{=}\underset{\underset{Z}{|}}{C}COO)_y{-}Q{-}(OOCG)_{y'}$$

IIB $$((CH_2{=}\underset{\underset{Z}{|}}{C}COO)_y{-}Q{-}OOC)_wG'$$

IIC $$(CH_2{=}\underset{\underset{Z}{|}}{C}COO)_y{-}Q{-}(OOCNHG)_{y'}$$

-continued

IID $$((CH_2{=}\underset{\underset{Z}{|}}{C}COO)_y{-}Q{-}OOCNH)_wG'$$

III $$(CH_2{=}\underset{\underset{Z}{|}}{C}COOROOCNH{-}G{-}NHCOO)_z{-}Q$$

IV $$\left[CH_2{=}\underset{\underset{Z}{|}}{C}COOR\left(\overset{\overset{X}{|}}{\underset{\underset{X}{|}}{OSi}}\right)_n(OOCNHG'NHCOO)_s\right]_rQ$$

In Formula I to IV inclusive, Z is hydrogen or methyl Q is the residue remaining after reaction of the caprolactone polyol, which is hereinafter more fully described; G is the monovalent residue remaining after reaction of a substituted or unsubstituted monocarboxylic acid or monoisocyanate and can be alkyl, aryl, [ alkenyl, ] aralkyl, alkaryl or cycloalkyl having up to about 12 carbon atoms; G′ is the polyvalent residue remaining after reaction of a substituted or unsubstituted polycarboxylic acid or polyisocyanate and can be nothing (when the divalent acid is oxalic acid), linear or branched alkylene having from 1 to about 10 carbon atoms; or arylene, alkarylene and aralkylene having from 6 to about 12 carbon atoms, cycloalkylene having from 5 to about 10 carbon atoms, and bicycloalkylene having from 7 to about 15 carbon atoms; R is linear or branched divalent alkylene having from 2 to about 5 carbon atoms; X is alkyl having from 1 to about 3 carbon atoms or phenyl; x is an integer having a value of from 1 to 4; y is an integer having a value of 1 to 3; y′ is an integer having a value of 1 to 3; the sum of y plus y′ is from 2 to 4; w is an integer equal to the valence of G′ and can be from 2 to about 4; n is an integer having a value of from 1 to about 10; and z is an integer having a value of zero or one.

The polycaprolactone polyol residue represented by Q is produced from caprolactone or a caprolactone polyol. The caprolactone polyols, whether monohydric or polyhydric, are commercially known compositions of matter and are fully described in U.S. 3,169,945. As used in this specification the terms caprolactone polyols and polycaprolactone polyols include compounds having one or more hydroxyl groups. As described therein the caprolactone polyols are produced by the catalytic polymerization of an excess of the caprolactone compound with an organic functional initiator having at least one reactive hydrogen atom; the polyols can be single compounds or mixtures of compounds, either can be used in this invention. The method for producing the caprolactone polyols is of no consequence. The organic functional initiators can be any hydroxyl compound, as shown in U.S. 3,169,945, and include methanol, ethanol, propanol, decanol, benzyl alcohol, and the like; diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols and similar polyalkylene glycols, either block, capped or heteric, containing up to about 40 or more alkyleneoxy units in the molecule, 3-methyl-1,5-pentanediol, cyclohexanediol, 4,4′-methylenebiscyclohexanol, 4,4′-isopropylidene-biscyclohexanol, xylendiol, 2-(4-hydroxymethylphenyl)-ethanol, and the like; triols such as glycerol, trimethylilpropane, 1,4-butanediol, 1,2,6-hexanetriol, triethanolamine, triisopropanolamine, and the like; tetrols such as erythritrol, pentaerythritol, N,N,N',N'-tetakis(2-hydroxyethyl)ethylenediamine, and the like.

When the organic functional initiator is reacted with the caprolactone a reaction occurs that can be represented in its simplest form by the equation:

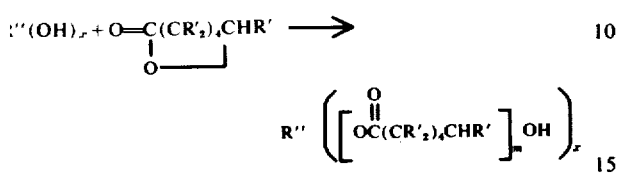

In this equation the organic functional initiator is the $R''-(OH)_x$ compound and the caprolactone is the

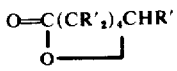

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. 3,169,945. The polycaprolactone polyols that are used to produce the acrylate-capped polycaprolactone polyols of this invention are shown by the formula on the right hand side of the equation; they can have a molecular weight of from 130 to about 20,000. The preferred caprolactone polyol compounds are those having a molecular weight of from about 175 to about 2,000. The most preferred are the polycaprolactone diol compounds having a molecular weight of from about 175 to about 500 and the polycaprolactone triol compounds having a molecular weight of from about 350 to about 1,000; these are most preferred because of their low viscosity properties. In the formula m is an integer representing the average number of repeating units needed to produce the compound having said molecular weights.

In the reaction of the polycaprolactone polyol with the acrylyl compound to produce the acrylate-capped polycaprolactone compound the reaction occurs at the hydroxyl group. Thus, when a monofunctional organic functional initiator is used to produce the polycaprolactone polyol, the residue thereof after reaction with the acrylyl compound can be represented by the formula:

V

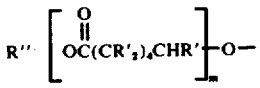

A difunctional organic functional initiator produces a polycaprolactone polyol that has the divalent residue of the formula

VI

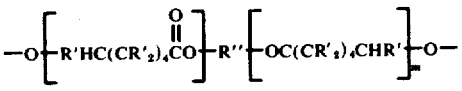

The residue from a polycaprolactone polyol produced with a trifunctional organic funcional initiator has the formula:

VII

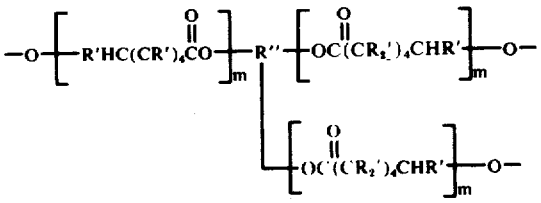

Finally, the residue from a polycaprolactone polyol produced with a tetrafunctional organic functional initiator has the formula:

VIII

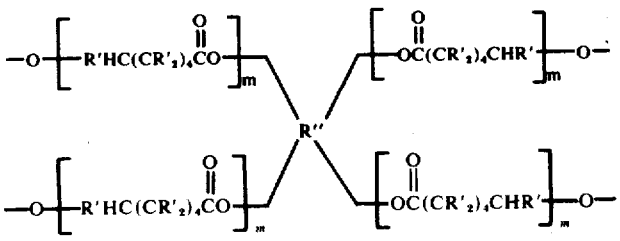

Thus, as used in this applicaion, the term "residue remaining after reaction of the polycaprolactone," as well as variants of this term, are defined by the Formulas V to VIII inclusive; these formulas with the oxygen atom outside the brackets removed represent the Q variable in Formulas I to IV inclusive. In Formulas V to VIII the R'' is the residue of the organic functional initiator; this term having the accepted meaning established in U.S. 3,169,945.

The monovalent residue of a monocarboxylic acid or monoisocyanate represented by G in Formulas IIA and IIC is obtained from a monocarboxylic acid or from a monoisocyanate, respectively. The polyvalent residue of a polycarboxylic acid or polyisocyanate represented by G' in Formulas IIB and IID is obtained from a polycarboxylic acid or polyisocyanate, respectively. Suitable carboxylic acids are those containing from one to about 20 carbon atoms, either saturated or unsaturated. These are well known and illustrated thereof one can mention formic acid, acetic acid, acetic anhydride, propionic acid, butyric acid, hexanoic acid, decanoic acid, stearic acid, arachidic acid, 3-butenoic acid, angelic acid, hydrosorbic acid, sorbic acid, crotonic acid, 1,2-dimethylbutyric acid, benzoic acid, 2-methylbenzenecarboxylic acid, naphthoic acid, oxalic acid, malonic acid, succinic acid, glutaric acid, brassylic acid, maleic acid, fumaric acid, glutonaconic acid, 2-octenedioc acid, 4-amyl-2,5-heptadienedioc acid, 1,1,5-pentanetricarboxylic acid, tricarballylic acid, phthalic acid, phthalic anhydride, terephthalic acid, and the like. Suitable organic isocyanates are the known aliphatic and aromatic isocyanates such as methyl isocyanate, ethyl isocyanate, chloroethyl isocyanate, chloropropyl isocyanate, chlorohexyl isocyanate, chlorobutoxypropyl isocyanate, hexyl isocyanate, phenyl isocyanate, the o-, m-, and p- chlorophenyl isocyanates, benzyl isocyanate, naphthyl isocyanate, o-ethylphenyl isocyanate, the dichlorophenyl isocyanates, methyl isocyanate, butyl isocyanate, n-propyl isocyanate, octadecyl isocyanate, 3,5,5-trimethyl-1-isocyanato-3-isocyanatomethylcyclohexane, di(2-isocyanatoethyl)-bicyclo[2.2.1]-hept-5-ene-2,3-dicarboxylate, 2,4-tolylene diisocyanate, 2,6-tolylene diisocyanate, 4,4'-diphenylmethane diisocyanate, dianisidine diisocyanate, tolidine diisocyanate, hexamethylene diisocyanate, the m- and p-xylylene diisocyanates, tetramethylene diisocyanate, dicyclohexyl-4,4'-methane diisocyanate, cyclohexane-1,4-diisocyanate, 1,5-naphthylene diisocyanate, 4,4'-diisocyanate diphenyl ether, 2,4,6-triisocyanate toluene, 4,4',4''-triisocyanate triphenyl methane, diphenylene-4,4-diisocyanate, the polymethylene polyphenylisocyanates, as well as any of the other organic isocyanates known to the average skilled chemist. Of course, mixtures of acids or mixtures of isocyanates can be used.

As is evident, the residue of a carboxylic acid is that portion of the molecule less the carboxyl groups, e.g. the residue of acetic acid is $CH_3$—, the residue of decanoic acid is $C_9H_{19}$—, the residue of benzoic acid is phenyl, the residue of glutaric acid is —$C_3H_6$—, the residue of phthalic anhydride is phenylene, etc. It is also evident that the same applies to the organic isocyanates; thus, the residue of methylisocyanate is $CH_3$—, the residue of phenyl isocyanate is phenyl, the residue of tolylene diisocyanate is tolylene, the residue of hexamethylene diisocyanate is —$C_6H_{12}$—, etc.

The group G' can be illustrated by phenylene, tolylene naphthylene, xylylene, biphenylene,

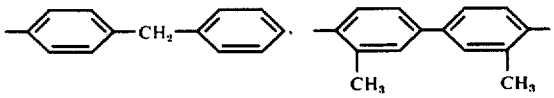

tetramethylene, hexamethylene, decamethylene, cyclohexylene,

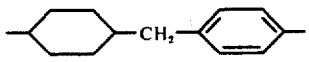

methylcyclohexylene,

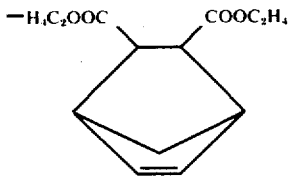

and the like. This G' is the divalent residue of any organic polyisocyanate, substituted or unsubstituted.

Illustrative of R one can mention the divalent radicals ethylene, 1,3-propylene, 1,2-propylene, butylene, pentylene, and the like. Suitable alkyl groups, dependent on the chain length definition set forth, are methyl, ethyl, propyl, isopropyl, butyl, isobutyl, pentyl, neopentyl, hexyl, octyl, 2-ethyloctyl, decyl, dodecyl, and the like. These are all obvious and known to those skilled in the art.

The acrylyl compounds suitable for use in producing the acrylate-capped polycaprolactones are acrylic acid, methacrylic acid, or the hydroxylalkyl acrylates and the hydroxyalkyl methacrylates of the formula $$CH_2{=}\underset{\underset{Z}{|}}{C}COOROH$$

wherein Z and R are as previously defined. The hydroxyalkyl acrylyl compounds are well known and can be illustrated by hydroxypropyl acrylate, hydroxypentyl methacrylate, hydroxylpropyl acrylate, hydroxypentyl methacrylate, and the like.

The acrylate-capped polycaprolactone polyol derivatives can be produced by several procedures and can be single compounds or mixtures of compounds; several preferred embodiments will be shown. In their production a solvent can be used and the solvent is preferably one which does and contain active hydrogen groups, i.e. hydroxyl, amino, amido, etc., in the solvent molecule. Among the suitable solvents one can mention the hydrocarbons such as octane, benzene, toluene, the xylenes, etc.; the ketones such as acetone, methyl ethyl ketone, etc.; the ethers such as diisopropyl ether, di-n-butyl ether, etc.; and the reactive solvents normally used in producing coating compositions that subsequently become incorporated in the coating such as styrene, alpha-methylstyrene, methyl methacrylate, ethyl acrylate, butyl acrylate, 2-ethoxyethyl acrylate, 2-butoxyethyl acrylate, 2-ethylhexyl acrylate, butyl methacrylate, 2-phenylethyl acrylate, 2-phenoxyethyl acrylate, furfuryl acrylate, etc.

The acrylate-capped polycaprolactone polyols of Formula I can be produced by heating a mixture of a polycaprolactone polyol with acrylic acid or methacrylic acid. Varying the concentration of the acrylic acid compound and the time and temperature of the reaction will enable one to produce a mono-acrylate in which x is one or a poly-acrylate in which x is 2, 3 or 4. Of course x cannot be greater than 2 if a poly-caprolactone diol is used, it cannot be greater than 3 with a polycaprolactone triol and it can be as high as 4 with a polycaprolactone tetrol. The reaction is preferably carried out at the reflux temperature and an esterification catalyst can be present. The concentration of acrylic acid compound can vary from about one mole to about 10 moles per mole of polycaprolactone polyol ised. Since the esterification reaction requires one carboxyl group from the acrylic acid compound per hydroxyl group present in the poly-caprolactone polyol the concentration of each reactant are generally based on the equivalent amounts needed to complete the reaction, with a minor excess of the acrylic acid composed generally charged when one wishes to esterify all of the hydroxyl groups present in the starting polycaprolactone polyol. One can also control the reaction and produce an acrylate-capped polycaprolactone polyol that has unreacted hydroxyl groups still present. For example, by the reaction of one mole of acrylic acid with one mole of the polycaprolactone diol having an average molecular weight of about 530, which diol is the reaction product of diethylene glycol and epsilon-caprolactone. This 1:1 molar ratio reaction yields the mono-hydroxyl mono-acrylate-capped polycaprolactone that can be represented by the general formula:

$$CH_2{=}CHCOO{-}Q{-}OH$$

The 2:1 molar ratio reaction would produce the di-acrylate capped polycaprolactone of the general formula:

$$CH_2{=}CHCOO{-}Q{-}OOCCH{=}CH_2$$

The acrylate-capped polycaprolactone esters of Formula IIA are produced by reaction a compound of Formula I having at least one free hydroxyl group with a monocarboxylic acid or its anhydride while the esters of Formula IIB are produced by reacting a compound of Formula I having a free hydroxyl group with a dicarboxylic acid or its anhydride. This latter reaction is carried out under known esterification conditions, as is the reaction to produce compounds of Formula I. Esterification catalysts can be present in small amounts, 0.01 to 5 weight percent; for example, p-toluene sulfonic acid, sulfuric acid, tetrabutyl titanate, etc. In carrying out the reaction an excess of the carboxylic acid is preferably present. The esterification reaction is preferably carried out in a solvent which can be used to azeotrope the water away from the reaction mixture. This technique is common. At the completion of the reaction, the acid catalyst is neutralized by conventional means and the reaction product is dried and recovered using conventional drying means, e.g., sodium sulfate, molecular sieves, etc., and conventional recovery procedures, e.g., filtering, decanting, distillation, etc.

When a monocarboxylic acid is reacted with a nonohydroxyl mono-acrylate-capped polycaprolactone of Formula I, the product has the formula:

IIA1

$$CH_2{=}\underset{\underset{Z}{|}}{C}COO{-}Q{-}OOCG$$

The mono-hydroxyl di-acrylate-capped polycaprolactones of Formula I produce compounds of the following formula when reacted with a mono-carboxylic acid:

IIA2

$$(CH_2{=}\underset{\underset{Z}{|}}{C}COO)_2{-}Q{-}OOCG$$

The di-hydroxyl mono-acrylate-capped polycaprolactones of Formula I react with a mono-carboxylic acid to produce compounds of the formula:

IIA3

$$CH_2{=}\underset{\underset{Z}{|}}{C}COO{-}Q{-}(OOCG)_2$$

Similarly, the mono-hydroxyl triacrylate-capped polycaprolactones of Formula I react with the mono-carboxylic acids to produce compounds of the formula:

IIA4

$$(CH_2{=}\underset{\underset{Z}{|}}{C}COO)_3{-}Q{-}OOCG$$

and the di-hydroxyl di-acrylate-capped and tri-hydroxyl mono-acrylate capped polycaprolactones produce, respectively, compounds of the formula: and

IIA5

$$(CH_2{=}\underset{\underset{Z}{|}}{C}COO)_2{-}Q{-}(OOCG)_2$$

and

IIA6

$$CH_2{=}\underset{\underset{Z}{|}}{C}COO{-}Q{-}(OOCG)_3$$

Of course, one can leave some of the hydroxyl groups unesterified. The manner of doing so is well known in the art. Illustrative of one type of such product are compounds of the formula:

IIA7

$$CH_2{=}\underset{\underset{Z}{|}}{C}COO{-}\underset{\underset{OH}{|}}{Q}{-}OOCG$$

All of the compounds represented by the subgeneric Formulas IIA1 to IIA7 set forth in this paragraph fall within the scope of Formula IIA.

The acrylate-capped polycaprolactone urethanes of Formula IIC are produced by reacting a compound of Formula I having at least one free hydroxyl group with an organic monoisocyanate. The reaction is carried out under anhydrous conditions in the presence of any of the known urethane catalysts such as the amines or tin compounds. These catalysts are so well known that they should not require more than a brief mention. They include triethylene diamine, morpholine, N-ethylmorpholine, piperazine, triethanolamine, triethylamine, N,N,N',N'-tetramethylbutane-1,3-diamine dibutyltin, dilaurate, stannous octoate, stannous laurate, dioctyltin diacetate, lead octoate, stannous oleate, stannous tallate, dibutyltin oxide, etc. The reaction is preferably carried out by the slow addition of the isocyanate to the mixture of catalyst and acrylate-capped polycaprolactone polyol; an inert solvent can be present if desired. The temperature of the reaction can be from about 10° C. to about 90° C.

The subgeneric formulas for the acrylate-capped polycaprolactone urethanes produced with a monoisocyanate correspond to Formulas IIA1 to IIA7 with the exception that the —OOCG group of said formulas is replaced by an —OOCNHG group.

The urethane compounds of Formula IID are similarly produced by reacting a compound of Formula I having a free hydroxyl group with an organic polyisocyanate such as tolylene diisocyanate.

The acrylate-capped polycaprolactone urethanes of Formula III can be produced by heating a mixture of polycaprolactone polyol, hydroxyalkyl acrylate and organic isocyanate, preferably in contact with one of the hereinbefore described catalysts for the urethane reactions. The reaction can also be carried out by adding the organic isocyanate to a mixture of the other components, or by feeding the polycaprolactone polyol and hydroxyalkyl acrylate, either as a mixture or in separate streams, to the organic isocyanate. In any instance, the reaction can be carried out either in the presence or absence of a solvent, as hereinbefore described.

The mole ratio of the polycaprolactone polyol to hydroxyalkyl acrylate can range from 1:0 to 1:25 preferably from 1:2 to 1:5 with sufficient organic isocyanate being added to react with all or substantially all of the hydroxyl groups present.

The reaction temperatures can vary from about 20° C. to about 90° C. or higher; preferably from about 50° C. to about 75° C. The reaction time will vary according to the size of the batch, the nature of each of the organic isocyanate, polycaprolactone polyol and acrylyl compound, as well as the reaction temperature employed.

The reaction can be carried out in air or in an inert gas atmosphere. Precautions should be taken to exclude water, which is known to react with the isocyanate group. To prevent premature reaction of the unsaturated acrylyl group, about 5 to 1,000 p.p.m. of a compound known to inhibit free radical polymerization can be added. These inhibitors are well known and include phenothiazine, hydroquinone, the monomethyl ether of hydroquinone, 2,6-di-t-butyl-p-cresol and other hindered phenols.

The acrylate-capped polycaprolactone siloxanes of Formula IV can be produced by the procedures used for producing the compounds of Formula III. The only difference is that there is additionally present a siloxane polymer. The preferred siloxane polymers are the methoxy capped dimethyl silicones, the methoxy capped diphenyl silicones and the methoxy capped methyl phenyl silicones having from 1 to 10 silicon atoms in the molecule. The reaction is carried out at from about 10° C. to about 90° C., preferably from about 40° C. to about 60° C. The concentration of siloxane polymer charged can vary from 0.1 to 3 moles per mole of polycaprolactone polyol charged, preferably from 0.5 to 2 moles.

Illustrative of polycaprolactone polyols that can be used as starting materials in this invention one can mention the reaction products of a polyhydroxyl compound having from 1 to 4 hydroxyl groups with caprolactone. The manner in which these caprolactone polyol compositions are produced is shown in U.S. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compound; this figure is shown in the third column.

POLYCAPROLACTONE POLYOLS

| Initiator | Average molecular weight of polyol | Average No. of CPL units in molecules |
|---|---|---|
| 1. Methanol | 146 | 1 |
| 2. Methanol | 602 | 5 |
| 3. Methanol | 2,312 | 20 |
| 4. Ethanol | 160 | 1 |
| 5. Ethanol | 4,640 | 40.3 |
| 6. Propanol | 1,428 | 12 |
| 7. Isopropanol | 573 | 4.5 |
| 8. Isopropanol | 858 | 7 |
| 9. Isopropanol | 1,827 | 15.5 |
| 10. Hexanol | 786 | 6 |
| 11. 2-ethylhexanol | 1,042 | 8 |
| 12. Decanol | 1,868 | 15 |
| 13. 2,6,8-trimethyl-i-nonanol | 528 | 3 |
| 14. Stearylalcohol | 1,125 | 7.5 |
| 15. Benzylalcohol | 1,134 | 9 |
| 16. Benzylcarbinol | 578 | 4 |
| 17. o-Tolylcarbinol | 863 | 6.5 |
| 18. Cycolhexanol | 727 | 5.5 |
| 19. Ethylene glycol | 290 | 2 |
| 20. Ethylene glycol | 803 | 6.5 |
| 21. ethylene glycol | 2,114 | 18 |
| 22. Propylene glycol | 874 | 7 |
| 23. Octylene glycol | 602 | 4 |
| 24. Decalene glycol | 801 | 5.5 |
| 25. Diethylene glycol | 530 | 3.7 |
| 26. Diethylene glycol | 850 | 6.5 |
| 27. Diethylene glycol | 1,246 | 10 |
| 28. Diethylene glycol | 2,000 | 16.6 |
| 29. Diethylene glycol | 3,356 | 30 |
| 30. Triethylene glycol | 754 | 5.3 |
| 31. Polyethylene glycol (MW 200)[1] | 713 | 4.5 |
| 32. Polyethylene glycol (MW 600)[1] | 1,396 | 7 |
| 33. Polyethylene glycol (MW 1,550)[1] | 2,818 | 12 |
| 34. 1,2-propylene glycol | 646 | 5 |
| 35. 1,3-propylene glycol | 988 | 8 |
| 36. Dipropylene glycol | 476 | 3 |
| 37. Polypropylene glycol (MW 425)[1] | 824 | 3.5 |
| 38. Polypropylene glycol (MW 1,004)[1] | 1,688 | 6 |
| 39. Polypropylene glycol (MW 2,000)[1] | 2,456 | 4 |
| 40. Hexylene glycol | 916 | 7 |
| 41. 2-ethyl-1,3-hexanediol | 602 | 4 |
| 42. 1,5-pentanediol | 446 | 3 |
| 43. 1,4-cyclohexanediol | 629 | 4.5 |
| 44. 1,3-bis(hydroxyethyl)-benzene | 736 | 5 |
| 45. Glycerol | 605 | 4. |
| 46. 1,2,6-hexanetriol | 476 | |
| 47. Trimethylolpropane | 590 | |
| 48. Trimethylolpropane | 761 | 5.4 |
| 49. Trimethylolpropane | 1,133 | 8.5 |
| 50. Triethanolamine | 890 | 6.5 |
| 51. Erythritol | 920 | |
| 52. Pentaerythritol | 1,219 | 9.5 |

[1]Average molecular weight of glycol.

The structure of the compounds in the above tabulation are obvious to one skilled in the art based on the information given. The structure of compound No. 6 is:

$$CH_3CH_2CH_2\left[\overset{O}{\overset{\|}{C}}O(CH_2)_5\right]_{12}OH$$

The structures of compound No. 25 is:

$$HO\left[(CH_2)_5\overset{O}{\overset{\|}{C}}O\right]_r CH_2CH_2OCH_2CH_2\left[\overset{O}{\overset{\|}{C}}O(CH_2)_5\right]_r OH$$

wherein the variable r is an integer, the sum of r+r has an average value of 4.3 and the average molecular weight is 527. The structure of compound No. 38 is:

$$HO\left[(CH_2)_5\overset{\overset{O}{\|}}{C}O\right]_r(C_3H_6O)_{16}C_3H_6\left[OC(C_2H)_5\right]_r OH$$

wherein the sum of r+r has an average value of 6 and the average molecular weght is 1595. This explanation makes explicit the structural formulas of compounds 1 to 52 set forth above.

The acrylate-capped polycaprolactone compounds of Formulas I to IV inclusive can be illustrated by the following compounds. This tabulation is illustrative only and is not to be considered a complete tabulation of all possible compounds since other compounds are obvious in view of applicants' teachings.

---

$CH_2{=}CHCOO(CH_2)_5COOCH_3$ $CH_2{=}CHCO[O(CH_2)_5CO]_4OC_4H_9$ $CH_2{=}C(CH_3)CO[O(CH_2)_5CO]_3OC_2H_5$ $CH_2{=}CHCO[O(CH_2)_5CO]_8OC_{18}H_{37}$ $CH_2{=}CHCO[O(CH_2)_5CO]_2OCH_2CH_2CH{=}CH_2$ $CH_2{=}CHCO[O(CH_2)_5CO]O_{10}$- 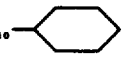

$CH_2{=}C(CH_3)CO[O(CH_2)_5CO]_3OCH_2C(CH_3)_3$ $CH_2{=}C(CH_3)CO[O(CH_2)_5CO]_8OCH(CH_3)_2$ $CH_2{=}CHCO[O(CH_2)_5CO]_2OCH_2$- 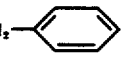

$CH_2{=}C(CH_3)CO[O(CH_2)_5CO]_{34}OC_2H_5$ $CH_2{=}CHCO[O(CH_2)_5CO]_4OCH_2$- 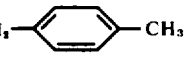 -$CH_3$ $(CH_2{=}CHCOO(CH_2)_5COO)_2C_2H_4$ $(CH_2{=}CHCO[O(CH_2)_5CO]_rO)_2C_2H_4$ (average of r is 4)

$(CH_2{=}CHCO[O(CH_2)_5CO]_rO)_2CH(CH_3)CH_2$ (average of r is .)

$(CH_2{=}C(CH_3)CO[O(CH_2)_5CO_rO)_2C_2H_4$ (average of r is 3.5)

$(CH_2{=}CHCO[O(CH_2)_5CO]_rO)_2C_{10}H_{20}$ (average of r is 6)

$(CH_2{=}CHCO[O(CH_2)_5CO]_rO)_2C_2H_4OC_2H_4$ (average of r is 4.3)

$(CH_2{=}C(CH_3)CO[O(CH_2)_5CO]_rO)_2C_2H_4OC_2H_4$ (average of r is 6)

$(CH_2{=}CHCO[O(CH_2)_5CO]_rO)_2H_4OC_2H_4$ (average of r is 35)

$(CH_2{=}CHCO[O(CH_2)_5CO]_rO)_2(C_2H_4O)_{12.5}C_2H_4$ (average of r is 4,5)

$(CH_2{=}CHCO[O(CH_2)_5CO]_rO)_2CH(CH_3)CH_2OCH(CH_3)CH_2$ (average of r is 5)

$(CH_2{=}CHCO[O(CH_2)_5CO]_rO)_2C_2H_4$- 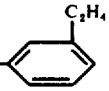 -$C_2H_4$ (average of r is 4)

$CH_2{=}CHCO[O(CH_2)_5CO]_rOH_2C$ $CH_2{=}CHCO[O(CH_2)_5CO]_rOHC$ (average of r is 6)

$CH_2{=}CHCO[O(CH_2)_5CO]_rOH_2C$ $(CH_2{=}CHCO[O(CH_2)_5CO]_rOCH_2)_3CCH_2CH_3$ (average of r is 4)

-continued $$\begin{array}{l} CH_2{=}CHCO[O(CH_2)_5CO]_rOH_2C \\ \quad | \\ CH_2{=}CHCO[O(CH_2)_5CO]_rOHC \\ \quad | \\ CH_2{=}CHCO[O(CH_2)_5CO]_rOHC \\ \quad | \\ CH_2{=}CHCO[O(CH_2)_5CO]_rOH_2C \end{array}$$ (average of r is 7)

$CH_2{=}CHCO[O(CH_2)_5CO]_rOC_3H_6O[OC(CH_2)_5O]_rH$ (average of r is 3.5)

$CH_2{=}CHCO[O(CH_2)_5CO]_rOC_2H_4OC_2H_4O[OC(CH_2)_5O]_rH$ (average of r is 5)

$CH_2{=}CHCO[O(CH_2)_5CO]_rO(C_2H_4O)_{10}[O(CH_2)_5O]_rH$ (average of r is 6)

$CH_2{=}CHCO[O(CH_2)_5CO]_rOC_2H_4O[OC(CH_2)_5O]_rOCH$ (average of r is 4)

$CH_2{=}CHCO[O(CH_2)_5CO]_rOC_2H_4OC_2H_4O[OC(CH_2)_5O]_rOCCH_3$ (average of r is 3.5)

$CH_2{=}CHCO[C(CH_2)_5CO]_rOC_{10}H_{20}O[OC(CH_2)_5O]_rOCC_6H_{13}$ (average of r is 5)

$CH_2{=}CHCO[O(CH_2)_5CO]_rOC_3H_6OC_3H_6[OC(CH_2)_5O]_rOC$ 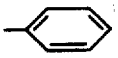 (average of r is 3,5)

$(CH_2{=}CHCO[O(CH_2)_5CO]_rOCH_2)_2\overset{CH_2CH_3}{\overset{|}{C}}CH_2O[OC(CH_2)_5O]_rOCCH_3$ (average of r is 4,5)

$(CH_2{=}CHCO[O(CH_2)_5CO]_rOC_2H_4OC_2H_4O[OC(CH_2)_5O]_rOC)_2$ (average of r is 3,5)

$(CH_2{=}CHCO[O(CH_2)_5CO]_rOC_2H_4OC_2H_4O[OC(CH_2)_5O]_rOC)_2C_4H_8$ (average of r is 4)

$\left(CH_2{=}CHCO[O(CH_2)_5CO]_rOC_3H_6O[OC(CH_2)_5O]_rOC\right)_2$ 1,4-phenylene (average or r is 6)

$CH_2{=}CHCO[O(CH_2)_5CO]_rOC_2H_4O[OC(CH_2)_4O]_rOCNHCH_3$ (average of r is 7,6)

$CH_2{=}CHCO[O(CH_2)_5CO]_rOC_2H_4OC_2H_4O[OC(CH_2)_5O]_rOCNH$ 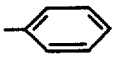 (average of r is 3,5)

$(CH_2{=}CHCO[O(CH_2)_5CO]_rOC_3H_6O[OC(CH_2)_5O]_rOCNH)_2C_6H_{12}$ (average of r is 4)

$\left(CH_2{=}CHCO[O(CH_2)_5CO]_rOC_2H_4OC_2H_4O[OC(CH_2)_5O]_rOCNH\right)_2$ 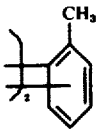 (average of r is 6)

$\left(CH_2{=}CHCO[O(CH_2)_5CO]_rOC_2H_4OC_2H_4O[OC(CH_2)_5O]OCNH\right.$ 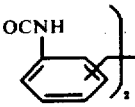 $\left.\right)_2$ $CH_3$ (average of r is 3,5)

$\left(CH_2{=}CHCOOC_2H_4OOCNH\right.$ 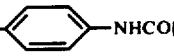 $\left.NHCO[O(CH_2)_5CO]_rO\right)_2C_2H_4OC_2H_4$ (average of r is 3.5)

$\left(CH_2{=}\overset{CH_3}{\overset{|}{C}}COOC_3H_6OOCNH\right.$ 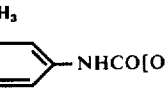 $\left.NHCO[O(CH_2)_5CO]_rO\right)_2C_2H_4OC_2H_4$ (average of r is 12)

$(CH_2{=}CHCOOC_8H_{16}OOCNHC_6H_{12}NHCO[O(CH_2)_5CO]_rO)_2C_3H_6$ (average of r is 6)

$CH_2{=}\overset{CH_3}{\overset{|}{C}}COOC_2H_4OOCNH$ 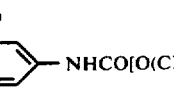 $NHCO[O(CH_2)_5CO]_rOCH_3$ $CH_2{=}CHCOOC_4H_8OOCNH$ 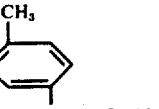 $NHCO[O(CH_2)_5CO]_7O$ 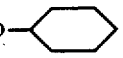

-continued
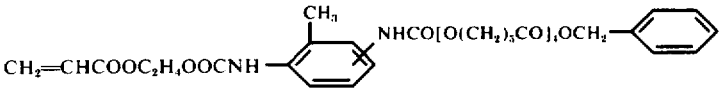
80/20 mixture of tolylene diisocyanates
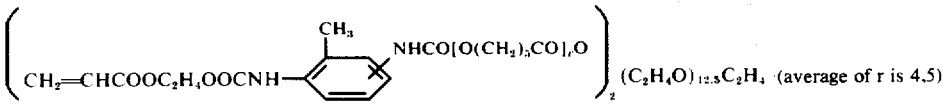
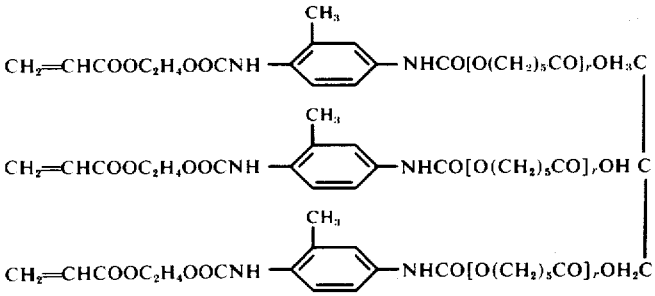
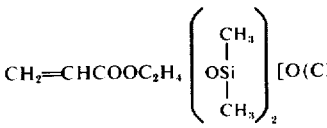
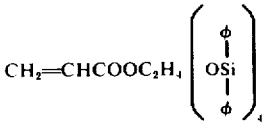
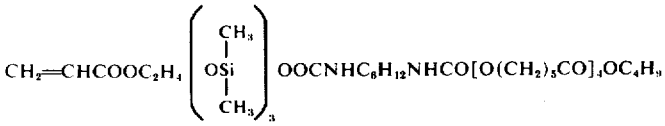
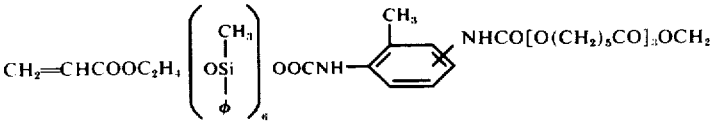
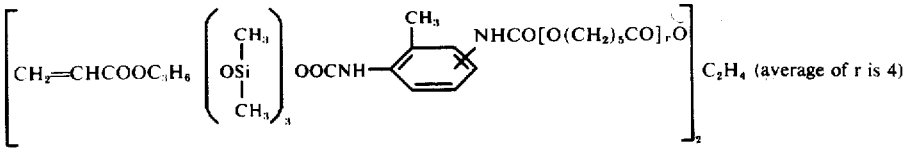
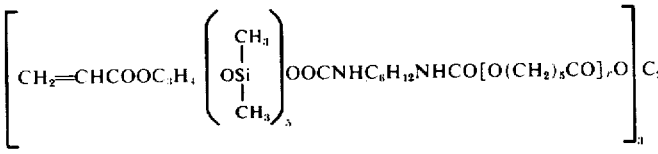

-continued

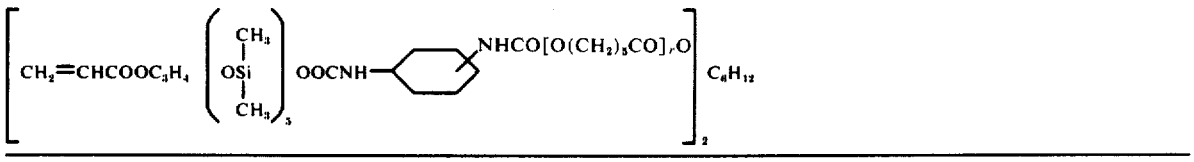

In the above compounds the term "average of r" means the average value of the total sum of all of the r variables in the compound.

In carrying out the processes for producing the acrylate-capped polycaprolactone compounds an inert gas atmosphere can be used, however, this is not essential for the process.

(2) The coating compositions

The acrylate-capped polycaprolactone compounds can be used per se as coating compositions, either alone or in admixture with conventional solvents, pigments, fillers and other additives. They can be applied by conventional means and cured by exposure to heat, light, electron radiation, X-ray radiation, and other known means for curing and crosslinking a polymer, either alone or in the presence of a crosslinker.

The acrylate-capped polycaprolactone polyols can also be used to produce coating compositions known as 100 percent solids coating compositions by mixing with a reactive solvent. These reactive solvents are well known to those skilled in the art and include olefinic monomers such as styrene, alpha-methyl styrene, and acrylyl compounds such as the acrylate esters, the methacrylate esters, the acrylamides and the methacrylamides. These acrylyl compounds can be represented by the formula:

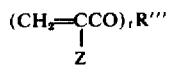

wherein Z is hydrogen or methyl; t is an integer having a value of 1 or 2; and R''' is alkoxy having from 1 to about 18 carbon atoms (e.g., methoxy, ethoxy, propoxy, isopropoxy, 2-methylhexoxy, 2-ethylhexoxy, decoxy, octadecoxy); hydroxyalkoxy having up to about 15 carbon (e.g., hydroxymethoxy, hydroxyethoxy, hydroxypropoxy, hydroxydecoxy); alkoxyalkoxy having up to a total of about 15 carbon atoms (e.g., methoxymethoxy, methoxyethoxy, ethoxybutoxy, methoxypropoxy, decoxypentoxy); cyano; cyanoalkoxy having up to about 15 carbon atoms (e.g., cyanomethoxy, cyanobutoxy, cyanodecoxy); aryloxy (e.g., phenoxy, toloxy, xyloxy, phenoxyethoxy, naphthoxy, benzyloxy); or an $-(OC_nH_{2n})_zNR''''_2$ group wherein n is an integer having a value of 1 to 10, z has a value of 0 or 1 and R'''' is alkyl having 1 to 10 carbon atoms when t is one or divalent alkylene or oxyalkylene having 2 to 8 carbon atoms in the alkylene moiety thereof when t is two.

Illustrative of suitable acrylyl compounds, many more of which are well known in the art, one can mention methyl acrylate, ethyl acrylate, 2-ethylhexyl acrylate, methoxyethyl acrylate, butoxyethyl acrylate, butyl acrylate, methoxybutyl acrylate, cyano acrylate, cyanoethyl acrylate, phenyl acrylate, methyl methacrylate, propyl methacrylate, methoxyethyl methacrylate, ethoxymethyl methacrylate, phenyl methacrylate, ethyl methacrylate, lauryl methacrylate, N,N-dimethyl acrylamide, N,N-diisopropyl acrylamide, N,N-didecyl acrylamide, N,N-dimethyl methacrylamide, N,N-diethyl methacrylamide, (N,N-dimethylamino)methyl acrylate, 2-(N,N-dimethylamino) ethyl acrylate, 2-(N,N-dipentylamino)ethyl acrylate, N,N-dimethylamino)-methyl methacrylate, 2-(N,N-diethylamino)propyl acrylate, ethylene glycol diacrylate, propylene glycol diacrylate, neopentyl glycol diacrylate, 1,6-hexanediol diacrylate, diethylene glycol diacrylate, triethylene glycol diacrylate, dipropylene glycol diacrylate, ethylene glycol diacrylate, ethylene glycol dimethacrylate, propylene glycol dimethacrylate, diethylene glycol dimethacrylate, tripropylene glycol diacrylate, and the like.

The coating compositions can contain from about 0.1 to about 10 weight percent of any activator such as any of the known photosensitizers or photoinitiators, preferably from about one to about 5 weight percent. These can be used singly or in mixtures and include, for example, benzophenone, p-methoxybenzophenone, acetophenone, m-chloroactophenone, propiophenone, xanthone, benzoin, benzil, benzaldehyde, naphthoquinone, anthraquinone, di-t-butyl peroxide, dicumyl peroxide, t-butyl hydroperoxide, t-butyl peracetate, peracetic acid, perbenzoic acid, benzoyl peroxide, dichlorobenzoyl peroxide, azobis(isobutyronitrile), dimethyl azobis(isobutyrate), morpholine, diethylamine, piperidine, pyrrolidine, and the like.

Thus, the coating compositions can contain from 10 to 100 weight percent of the acrylate-capped polycaprolactone compound of Formulas I to IV inclusive, with from 40 to 95 weight percent preferred, and from about 50 to 85 weight percent being most preferred. The concentration of reactive solvent can be from zero to about 90 weight percent, with from 5 to 60 weight percent preferred, and from 10 to 50 weight percent most preferred.

The coating compositions are produced by conventional methods by mixing the selected components together. To facilitate preparation one can apply a small amount of heat. The coatings can be applied by conventional means, including spray, curtain, dip, pad, roll-coating and brushing procedures. They may, if desired, be dried under ambient or oven conditions. The coatings can be applied to any acceptable substrate such as wood, metal, glass, fabric, paper, fiber, plastic that is in any form, e.g., sheet, coil, molded, film, panel, tube, etc.

The coating compositions containing acrylate-capped polycaprolactone compounds can be cured by exposure to heat or radiation, either before or after the coating has dried. The radiation can be ionizing radiation, either particulate or non-particulate or non-ionizing radiation. As a suitable source of particulate radiation, one can use any source which emits electrons or charged nuclei. Particulate radiation can be generated from electron accelerators such as the Van de Graaff accelerator, resonance transformers, linear accelerators, insulating core transformers, radioactive elements such as cobalt-60 strontium-90, etc. As a suitable source of non-particulate ionizing radiation, one can use any source which emits radiation in the range of from about $10^{-3}$ angstroms, to about 2000 angstroms, preferably from about $5\times10^{-3}$ angstroms to about 1 angstrom. Suitable sources are vacuum ultraviolet lamps, such as xenon or krypton arcs, and radioactive elements such as cesium-137, strontium-90, and cobalt-60. The nuclear reactors are also known to be a useful source of radiation. As a suitable source of non-ionizing radiation, one can use any source which emits radiation of from about 2000 angstroms to about 4000 angstroms. Suitable sources are mercury arcs, carbon arcs, tungsten filament lamps, xenon arcs, krypton arcs, sunlamps, lasers, and the like. All of these devices and sources are well known in the art and those skilled in radiation technology are fully aware of the manner in which the radiation is generated and the precautions to be exercised in its use.

The use of low to high pressure mercury lamps to generate ultraviolet light is known. The largest such mercury lamp of commercial utility is generally about five feet long having a diameter of about one to two inches with an electrical input of about 20 kilowatts generating a typical low intensity ultraviolet light line structure (source intensity is generally no greater than about 20 kilowatts per square foot of source projected area). An appreciable period of time is generally needed for completion of a reaction when a material is exposed to the low intensity ultraviolet radiation generated from a mercury lamp.

The ionizing radiation dosage necessary to effect curing or crosslinking will vary depending upon the composition of the particular coating that is undergoing radiation, the extent of crosslinking desired, the number of crosslinkable sites available and the molecular weight of the starting polymer in the coating composition. The total dosage will be from about $10^3$ rads to $10^8$ rads, preferably from $5\times10^3$ rads to $10^7$ rads. A rad is 100 ergs of ionizing energy absorbed per gram of material being irradiated.

Recently a source of light radiation emitting high intensity predominantly continuum light radiation containing ultraviolet, visible and infrared radiation that can be used to polymerize monomers and to crosslink polymer compositions was discovered, namely the swirl-flow plasma arc radiation source. By means of proper light filters one can selectively screen out a portion of the light radiation emitted, permitting only that wavelength portion desired to reach the material being treated.

The term "high intensity predominantly continuum light radiation" means continuum radiation with a radiance or source intensity of at least 350 watts per square centimeter steradian (about 1000 kilowatts per square foot of source projected area) having only a minor part of the energy in peaks of bandwidths less than 100 Angstrom units, with less than about 30 percent of the light radiated having wavelengths shorter than 4,000 angstrom units and at least about 70 percent of the light energy radiated having wavelengths longer than 4,000 angstrom units.

This light radiation is derived from an artificial source that generates high intensity predominantly continuum light radiation with a source intensity of at least about 350 watts per square centimeter steradian, as abbreviated by the term: watts $cm.^{-2}$ $sr^{-1}$; said high intensity predominantly continuum artificial light radiation has about 70 percent of the light radiated at a wavelength longer than 4,000 angstroms and less than about 30 percent of the light radiated having a wavelength shorter than 4,000 angstroms, generally about 80 percent of the light radiated has a wavelength longer than 4,000 angstroms and less than about 20 percent of the light radiated has a wavelength shorter than 4,000 angstroms, and a source intensity that can vary from about 350 watts (about 1000 kilowatts per square foot of source projected area) to about 5,000 watts (about 15,000 kilowatts per square foot of source projected area) or more per square centimeter steradian. A convenient source of high intensity predominantly continuum light radiation is a swirl-flow plasma arc light radiation apparatus. The equipment for generating high intensity predominantly continuum light radiation by this means is known and available; many different forms thereof are described in the literature. A highly efficient apparatus for obtaining high intensity predominantly continuum light radiation is the swirl-flow plasma arc radiation source described in U.S. 3,364,387. The apparatus or equipment necessary for generating the light radiation is not the subject of this invention and any source or apparatus capable of generating high intensity predominantly continuum light radiation can be used.

While any artificial source of generating high intensity predominantly continuum light radiation can be used, as previously indicated the swirl-flow plasma arc radiation apparatus is most convenient. Hence, this source will be used in this application as illustrative of a means for obtaining the high intensity predominantly continuum light radiation. Any apparatus that operates according to the known principles of the swirl-flow plasma arc radiation source can be used to produce the high intensity predominantly continuum light radiation useful in the processes of this invention. These apparatuses are often known by other terms but those skilled in this art recognize that they emit high intensity predominantly continuum light radiation. The source of radiation in a 50 kilowatt swirl-flow plasma arc radiation source is an arc only about four inches long enclosed in a quartz envelope about 1.5 inches in diameter. This lamp can be readily removed and refurbished and has an acceptable long lifetime. Further, a swirl-flow plasma arc radiation apparatus having a 250-kilowatt rating would be only about two or three times as large as a 50-kilowatt source. Another advantage is the absence of a need for expensive radiation shielding. Precautions required for the artificial light sources include those needed to protect one's eyes from the intense visible light and from the ultraviolet light present to prevent inadvertent sunburn effect on the body.

It is to be noted that in the spectra of high intensity predominantly continuum light radiation there is a continuum of radiation throughout the entire spectral range. This type of continuum radiation in the ultraviolet range has not heretofore been obtainable from the conventional commercial mercury arcs of lamps generally available for generating ultraviolet light. The previously known means for generating ultraviolet light produced light that shows a line or peak spectrum in the ultraviolet range, it is not a continuum spectrum in the ultraviolet range. In a line spectrum the major portion of usesble ultraviolet light is that portion at which the line or band in the spectrum forms a peak; in order for such energy to be useful the material or composition that is to be treated with ultraviolet radiation must be capable of absorbing at that particular wavelength range at which the peak appears. In the event the material or composition does not have the ability to absorb at that particular wavelength range there is little or no absorption or reaction. Thus, in the event the material or composition to be treated absorbs at a particular wavelength range in one of the valleys of the spectral curve there will be little or no reaction since there is little or no ultraviolet energy to adequately excite the system. With a high intensity predominantly continuum radiation, there is a high intensity continuum radiation of ultraviolet energy across the entire ultraviolet wavelength range of the spectrum and there is generally sufficient ultraviolet energy generated at all useful ultraviolet wavelengths to enable one to carry out reactions responsive to ultraviolet radiation without the problem of selecting compounds that will absorb at the peak wavelength bands only. With the high intensity continuum radiation now discovered one does not have the problem of being unable to react materials or compositions that absorb in the valley areas only since for all intents and purposes such valleys do not exist in high intensity continuum radiation, the high intensity radiated light energy is essentially a continuum, it is not in peak bands.

High intensity predominantly continuum light radiation is to be distinguished from low intensity ultraviolet radiation generated by commercially available low, medium and high pressure mercury arc ultraviolet lamps. These mercury arc lamps produce light emission which is primarily line or peak rather than continuum light, wherein a major part of the light appears in bands narrower than 100 angstrom units, and much less than 70 percent is above 4,000 angstrom units.

As is known, high intensity predominantly continuum light radiation from a swirl-flow plasma arc radiation source is emitted from an arc generated between a pair of electrodes that are lined up axially and encased in a quartz cylinder. In an embodiment a pair of concentric quartz cylinders between which cooling water or gas flows is used. A rare gas, such as argon, krypton, neon or xenon, introduced into the inner cylinder tangentially through inlets located at one end of the inner cylinder creates a swirling flow or vortex which restricts the arc to a small diameter. An electrical potential applied across the electrodes causes a high density current to flow through the gas to generate a plasma composed of electrons, positively charged ions and neutral atoms. A plasma generated in the above gases produces high intensity predominantly continuum light radiation with diffuse maxima in the region of from about 3,500 to about 6,000 angstroms. The radiation source can also be used with reflectors or refractive optical systems to direct the high intensity predominantly continuum light radiation emanating from the arc to a particular point or direction or geometrical area.

The acrylate-capped polycaprolactone compositions are readily cured by exposure to the predominantly continuum light radiation for a short period of time. The exposure can vary from a period as short as a fraction of a second to a period that may be as long as ten minutes or longer. In most instances a period of from about 0.1 second to about two minutes is adequate. The distance of the acrylate-capped polycaprolactone composition from the arc source can vary from a fraction of an inch up to 10 feet or more; preferably the distance is from about one foot to about 4 feet. Exposure can be under normal atmospheric conditions or under an inert gas blanket, for example under nitrogen; the preferred process is to use an inert gas atmosphere.

ILLUSTRATIVE EXAMPLES

EXAMPLE 1

A polycaprolactone polyol (98 grams), produced as described in U.S. 3,169,945 by the reaction of diethylene glycol and epsilon-caprolactone and having an average molecular weight of about 530, was placed in a 500 ml. flask that was equipped with a stirrer, thermocouple and two dropping funnels. After the addition of one drop of dibutyltin dilaurate the mixture was heated to 80° C. in an oil bath and 128 grams of bis(2-isocyanatoethyl)5-norbornen-2,3-dicarboxylate and 52 grams of 2-hydroxypropyl acrylate were co-fed in a dropwise manner while stirring vigorously. The addition of the hydroxypropyl acrylate was completed in two hours; thereafter the mixture was stirred for an additional one-half hour at 80° C. The acrylate-capped polycaprolactone urethane produced had the basic structure:

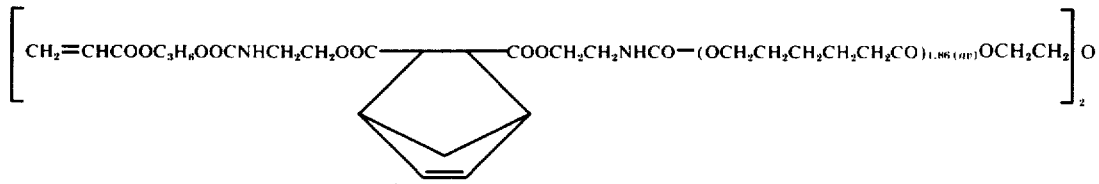

This product was a clear, straw yellow liquid. A solution containing 73 weight percent of the acrylate-capped polycaprolactone and 27 weight percent of 2-butoxyethyl acrylate had a Brookfield viscosity of 1,780 cps. at 23° C.

In a similar manner the acrylate-capped polycaprolactone of the following structure is produced by the use of 2-hydroxyethyl methacrylate and a polycaprolactone polyol having an average molecular weight of about 786 that was produced by the reaction of hexanol and epsiloncaprolactone

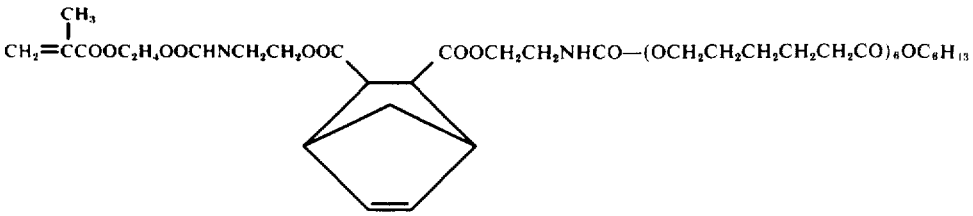

EXAMPLE 2

A solution of 98 grams of the polycaprolactone polyol used in Example 1, 52 grams of 2-hydroxypropyl acrylate and one drop of dibutyltin dilaurate was heated to 70° C. The solution was stirred while 69.6 grams of an 80/20 mixture of 2,4- and 2,6-tolylene diisocyanates was added in a dropwise manner over a period of two hours. The mixture was stirred for an additional one-half hour and then 0.002 gram of 4-methoxyphenol was added as a stabilizer. The acrylate-capped polycaprolactone urethane produced had the basic structure:

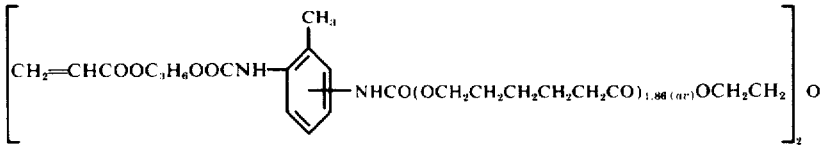

This product was a clear liquid. A solution containing 73 weight percent of the acrylate-capped polycaprolactone and 27 weight percent of 2-butoxyethyl acrylate had a Brookfield viscosity of 2,270 cps. at 23° C.

EXAMPLE 3

In a method similar to that described in Example 1, a solution of 98 grams of the same polycaprolactone polyol, 73.2 grams of 2-butoxyethyl acrylate as solvent, one drop of dibutyltin dilaurate and 0.01 gram of 4-methoxyphenol was heated to 70° C. and 69.6 grams of an 80/20 mixture of 2,4- and 2,6-tolylene diisocyanate and 52 grams of 2-hydroxypropyl acrylate were simultaneously co-fed as separate streams over a period of two hours. The mixture was stirred an additional one-half hour at 65° C. The light yellow solution of the acrylate-capped polycaprolactone urethane had a Brookfield viscosity of 20,000 cps. at 23° C.

EXAMPLE 4

A solution containing 98 grams of the same polycaprolactone polyol used in Example 1, 52 grams of 2-hydroxypropyl acrylate, 81.2 grams of 2-butoxyethyl acrylate and one drop of dibutyltin dilaurate was heated to 70° C. and then 69.6 grams of an 80/20 mixture of 2,4- and 2,6-tolylene diisocyanates were added in a dropwise manner over a period of about two hours. The reaction mixture was stirred another half-hour at about 70° C. and then 0.002 gram of 4-methoxyphenol was added. The solution of the acrylate-capped polycaprolactone urethane had a Brookfield viscosity of 13,600 cps. at 23° C.

The acrylate-capped polycaprolactone polymer produced in Examples 3 and 4 had the same basic structure as the polymer produced in Example 2.

EXAMPLE 5

In a method similar to that described in Example 1, 128 grams of bis(2-isocyanatoethyl)5-norbornen-2,3-dicarboxylate and a mixture of 46.4 grams of 2-hydroxyethyl acrylate containing 0.005 gram of 4-methoxyphenol were simultaneously co-fed to a mixture of 98 grams of the same polycaprolactone polyol and one drop of dibutyltin dilaurate and reacted as described in Example 1. The acrylate-capped polycaprolactone urethane was light yellow and had the basic structure:

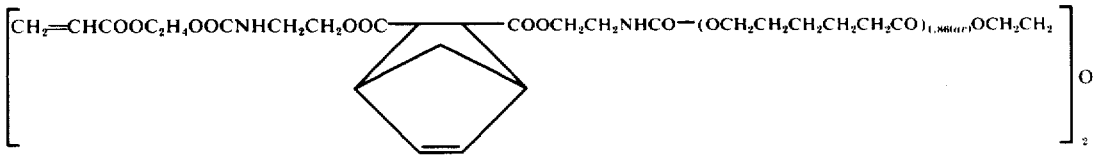

A solution was prepared containing 73 weight percent of the acrylate-capped polycaprolactone and 27 weight percent of 2-butoxyethyl acrylate; it had a Brookfield viscosity of 2,800 cps. at 23° C.

EXAMPLE 6

In a method similar to that described in Example 4, 69.6 grams of an 80/20 mixture of 2,4- and 2,6-tolylene diisocyanates was added to a solution of 98 grams of the polycaprolactone polyol used in Example 1, 46.4 grams of 2-hydroxylethyl acrylate, 0.005 gram of 4-methoxyphenol, 79.2 grams of 2-butoxyethyl acrylate and one drop of dibutyltin dilaurate. The solution of acrylate-capped polycaprolactone urethane resin that was produced had a Brookfield viscosity of 2,100 cps. at 23° C. The resin had the basic structure:

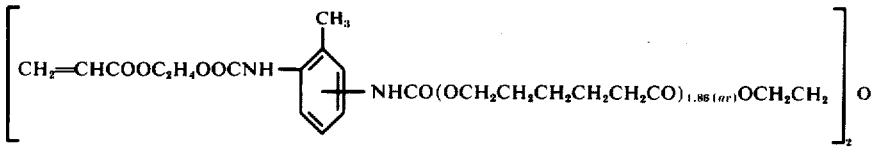

EXAMPLE 7

In a method similar to that described in Example 1, 69.6 grams of an 80/20 mixture of 2,4- and 2,6-tolylene diisocyanates and a mixture of 46.4 grams of 2-hydroxyethyl acrylate and 0.005 gram of 4-methoxyphenol were simultaneously co-fed to a solution of 98 grams of the same polycaprolactone polyol used in Example 1, 79.2 grams of 2-butoxyethyl acrylate and one drop of dibutyltin dilaurate. The solution of acrylate-capped polycaprolactone urethane produced had a Brookfield viscosity of 6,750 cps. at 23° C. The resin had the same basic structure shown in Example 6.

EXAMPLE 8

In a method similar to that described in Example 4, 104.4 grams of an 80/20 mixture of 2,4- and 2,6-tolylene diisocyanate and a mixture of 69.6 grams of 2-hydroxyethyl acrylate containing 0.007 gram of 4-methoxyphenol were simultaneously co-fed to a solution of 106.8 grams of a polycaprolactone polyol that had an average molecular weight of about 530, 82.4 grams of 2-butoxyethyl acrylate and one drop of dibutyltin dilaurate. The polycaprolactone polyol was the reaction product of trimethylolpropane and epsilon-caprolactone. The addition and reaction was carried out at about 65° C. The resin had the basic structure:

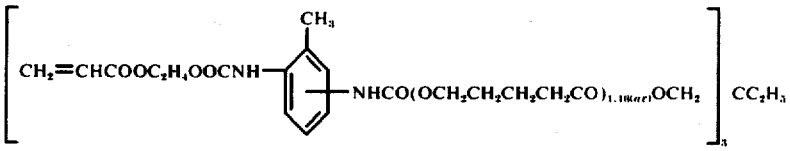

EXAMPLE 9

In a method similar to that described in Example 1, 104.8 grams of methylenebis(4-isocyanatophenyl) and 46.4 grams of 2-hydroxy-ethyl acrylate were simultaneously co-fed over a period of three hours to a solution of 98 grams of the polycaprolactone polyol used in Example 1, 92.2 grams of 2-butoxyethyl acrylate and one drop of dibutyltin dilaurate. The light yellow solution containing the acrylate-capped polycaprolactone urethane polymer had a Brookfield viscosity of 16,900 cps. at 23° C. The polymer had the basic structure:

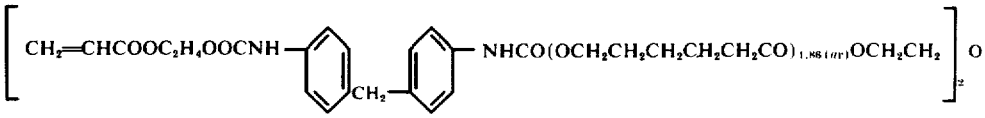

EXAMPLE 10

A solution of 213.6 grams of the polycaprolactone polyol used in Example 8, 146.2 grams of 2-hydroxyethyl acrylate, one drop of dibutyltin dilaurate, 0.015 gram of 4-methoxyphenol and 142.2 grams of 2-butoxyethyl acrylate was heated to 65° C. Over a period of two hours, 208.8 grams of an 80/20 mixture of 2,4- and 2,6-tolylene diisocyanates was added and the solution was stirred an additional nine hours at 65° C. The solution contained 80 weight percent of acrylate-capped polycaprolactone urethane resin having the same basic structure as the product of Example 8. Additional 2-butoxyethyl acrylate was added to dilute the solution to a 55 weight percent content of acrylate-capped polycaprolactone resin. This diluted solution had a Brookfield viscosity of 1,950 cps. at 23° C.

EXAMPLE 11

A series of acrylate-capped polycaprolactone resins was prepared. In these reactions the polycaprolactone polyol, the 2-butoxyethyl acrylate, one drop of dibutyltin dilaurate and the 2-hydroxyethyl acrylate were placed in brown bottles. To these solutions there was added the 80/20 mixture of 2,4- and 2,6-tolylene diisocyanates over a period of one to two hours, vigorously shaking after each addition. The capped bottles were left in an oven at 60° C. for 16 hours. The Brookfield viscosities were determined on 80 percent solution of the acrylate-capped polycaprolactone resins in 2-butoxyethyl acrylate. The 2-hydroxyethyl acrylate contained 40 parts per million of 4-methoxyphenol.

| Run | A | B | C | D | E | F | G | H |
|---|---|---|---|---|---|---|---|---|
| PCP, type | I | I | I | I | II | II | II | II |
| PCP,g | 48.8 | 39.3 | 28.3 | 15.4 | 38.0 | 29.4 | 20.3 | 10.5 |
| BEA,g | 11.1 | 11.1 | 11.1 | 11.1 | 11.1 | 11.1 | 11.1 | 11.1 |
| HEA,g | 21.1 | 28.4 | 36.8 | 46.6 | 25.6 | 33.0 | 41.0 | 49.4 |
| TDI,g | 30.1 | 32.3 | 34.9 | 38.0 | 36.4 | 37.6 | 38.8 | 40.2 |

-continued

| Run | A | B | C | D | E | F | G | H |
|---|---|---|---|---|---|---|---|---|
| Viscosity, cps | 9,920 | 5,960 | 4,980 | 3,460 | 111,000 | 34,000 | 15,700 | 3,400 |

PCP-I=polycaprolactone polyol of Example 1.
PCP-II=polycaprolactone polyol of Example 8.
BEA=2-butoxyethylacrylate.
HEA=2-hydroxyethylacrylate.
TDI=tolylene diisocyanate.

EXAMPLE 12

A series of acrylate-capped polycaprolactone resins was prepared in a manner similar to that described in Example 11. The tolylene diisocyanate was added in five milliliter increments over a period of about two hours. Thereafter the bottles were capped, allowed to stand at room temperature for 24 hours, and then left in an oven at 60° C. for 16 hours. The amounts of reactants charged and the Brookfield viscosities at 23° C. of a 60 weight percent solution of the resin in the acrylate solvents are set forth below:

| Run | A | B | C | D |
|---|---|---|---|---|
| PCP-II,g | 26.7 | 21.4 | 32.0 | 26.7 |
| EEA,g | 28.4 | 29.8 | 31.1 | |
| BA,g | | | | 28.4 |
| HEA,g | 18.6 | 21.9 | 14.6 | 18.6 |
| TDI,g | 26.1 | 26.1 | 26.1 | 26.1 |
| Viscosity, cps | 1,630 | 650 | 4,650 | 1,170 |

PCP-II=polycaprolactone polyol of Example 8.
EEA=2-ethoxyethyl acrylate.
BA=butyl acrylate
HEA=2-hydroxyethyl acrylate.
TDI=tolylene diisocyanate.

EXAMPLE 13

A mixture of 271 grams of the polycaprolactone polyol used in Example 1, 7,017 grams of glacial acrylic acid and 50 cc. of benzene was heated in a flask until a homogeneous solution was obtained. Nitrogen was bubbled through the mixture during the entire reaction. After solution was achieved 0.8 percent of sulfuric acid catalyst and 0.1 percent of phenothiazine were added and the solution was maintained at a steady reflux at 80° C. to 95° C. until amost of the water of reaction had distilled over. The reaction mixture was cooled to room temperature and 6 grams of calcium hydroxide was added to neutralize the sulfuric acid and the unreacted excess acrylic acid. It was then filtered, stripped of benzene, and dried over molecular sieves. This acrylate-capped polycaprolactone had the basis structure:

$$[CH_2{=}CHCO(OCH_2CH_2CH_2CH_2CH_2CO)_{1.86\,(av)}OCH_2CH_2]_2O$$

EXAMPLE 14

To a portion of the acrylate-capped polycaprolactone of Example 13 there was added five weight percent of an 80/20 mixture of 2,4- and 2,6-tolylene diisocyanates. This mixture was reacted at 60° C. to produce a mixture of the urethane oligomer having the basic structure which is indicated below and the acrylate-capped polycaprolactone of Example 13.

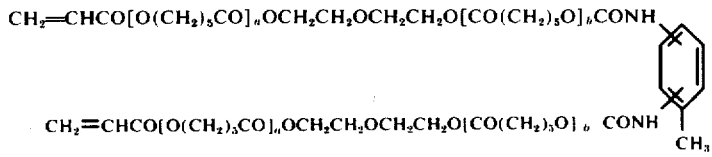

(sum of a and b has a total average value of 3.7).

EXAMPLE 15

There were charged to a one liter flask 200 grams of the polycaprolactone polyol of Example 8, 400 ml. of benzene and 0.25 ml. of dibutyltin dilaurate and the mixture was stirred to solution. Over a thirty minute period 176.1 grams of bis(2-isocyanatoethyl)-5-norbornen-2,3-dicarboxylate were added at about 15° C. to about 25° C. Then the reaction mixture was stirred at 50° C. for about one hour and ten minutes at which time 113.4 grams of 2-hydroxypropyl acrylate, containing 0.003 gram of 4-methoxyphenol were added and the solution was allowed to stand overnight at room temperature. There were obtained 825.2 grams of a benzene solution of the acrylate-capped polycaprolactone resin, the solution having a total solids content of 54.45 percent. The reduced viscosity at 30° C. of a 0.5 percent solution of acrylate-capped polycaprolactone resin in benzene was 0.043 dl./gm.

EXAMPLE 16

A series of coating compositions was produced by mixing the acrylate-capped polycaprolactone resins of Examples 1 to 4 with different acrylyl compounds, as indicated in the following table. The liquid compositions were used to coat steel panels using a number three wire-wound rod. The coatings were cured by exposure of the wet film to electrons generated by a 300 kilovolt electron accelerator. The results are set forth below:

| Coating composition | A | B | C | D | E | F |
|---|---|---|---|---|---|---|
| Resin, source, Ex | 1 | 2 | 3 | 3 | 4 | 4 |
| Parts | 73 | 56.2 | 73 | 56.2 | 63 | 56.2 |
| Acrylyl compound, parts: | | | | | | |
| BEA | 27 | 18.7 | 27 | 18.7 | 26 | 18.7 |
| EHA | | 18.2 | | 18.2 | | 18.2 |

-continued

| Coating composition | A | B | C | D | E | F |
|---|---|---|---|---|---|---|
| NPGDA | | 6.9 | | 6.9 | | 6.9 |
| DEGDA | | | | | 11 | |
| Brookfield viscosity, cps. at 23° C. | 1,780 | 800 | 20,000 | 1,940 | 13,600 | 1,499 |
| Dose to cure, megarads | 8 | 24 | 16 | 16 | 16 | 16 |
| Sward hardness, glass=100 | 26 | 30 | 16 | 16 | 16 | 14 |
| Reverse impact, in. lb | | | Greater than 165 | | | |
| Adhesion (post-irradiation): | | | | | | |
| Cross-hatch | E | E | E | P | G | E |
| Impacted bump | P | G | P | P | P | G |
| Burr/edge | F | E | E | P | P | E |
| Adhesion (post-pasteurization): | | | | | | |
| Cross-hatch | P | F | P | P | P | P |
| Burr/edge | P | E | P | P | P | P |

E=excellent; G=good; F=fair; P=poor.
BEA=2-butoxyethyl acrylate.
EHA=2-ethylhexyl acrylate.
NPGDA=neopentyl glycol diacrylate.
DEGDA=diethylene glycol diacrylate.

EXAMPLE 17

The compositions of Runs A to H of Example 11 were coated on steel panels and cured in air by the procedure described in Example 16. The coatings were given a total radiation dosage of four megarads. In those instances in which a slightly tack film was obtained after this treatment, continued radiation will eliminate the tackiness.

| Coating composition | 1 | 2 | 3 | 4 | 5 | 6 | 7 | 8 |
|---|---|---|---|---|---|---|---|---|
| Resin source, Example 11, Run. | A | B | C | D | E | F | G | H |
| Sward hardness, glass=100 | 6 | 6 | 6 | 6 | 12 | 22 | 26 | 18 |
| Reverse impact, in lb. | >165 | >165 | 20 | 5 | 30 | 5 | 5 | 18 |
| Film condition | (1) | (1) | (1) | (1) | (2) | (2) | (2) | (1) |

[1] Sl. tack.
[2] Cured.

EXAMPLE 18

The compositions of Runs A to G of Example 11 were diluted with sufficient 2-ethoxy-ethyl acrylate to obtain diluted compositions having Brookfield viscosities at 23° C. of 250±50 cps. Three mil thick coatings were made on steel panels and cured in air by the procedure described in Example 16. The results are tabulated below.

| Coating composition | 1 | 2 | 3 | 4 | 5 | 6 | 7 |
|---|---|---|---|---|---|---|---|
| Resin source, Example 11, Run | A | B | C | D | E | F | G |
| Dose to cure, megarads | 10 | 10 | 10 | 8 | 6 | 4 | 4 |
| Sward hardness, glass=100 | 10 | 14 | 14 | 18 | 18 | 24 | 16 |
| Reverse impact, in lb. | | | Greater than 165 | | | | |
| Adhesion (post-irradiation): | | | | | | | |
| Cross hatch | P | P | P | E | E | E | F |
| Impacted bump | P | P | P | F | F | E | F |
| Burr edge | E | E | E | E | E | E | E |
| Adhesion (post-pasturization): | | | | | | | |
| Cross hatch | E | P | P | P | E | E | F |
| Burr edge | E | P | E | P | F | E | F |

EXAMPLE 19

Coating compositions 1 to 7 of Example 18 were cured as described in Example 18 with the exception that the irradiations were conducted in a nitrogen atmosphere. The coatings were all cured after radiation with a dosage of 2 megarads and all had a reverse impact of more than 165 inch pounds. The results are tabulated in the following table:

| Coating composition | 1 | 2 | 3 | 4 | 5 | 6 | 7 |
|---|---|---|---|---|---|---|---|
| Sward hardness, glass=100 | 26 | 36 | 24 | 34 | 22 | 30 | 46 |
| Adhesion (post-irradiation): | | | | | | | |
| Cross hatch | F | F | P | E | E | E | G |
| Impacted bump | P | P | P | G | G | G | G |
| Burr Edge | P | E | E | E | E | E | E |
| Adhesion (post pasteurization): | | | | | | | |
| Cross hatch | P | P | P | P | P | E | E |
| Impacted bump | P | P | P | P | P | E | E |

EXAMPLE 20

The compositions of Runs A to H of Example 11 were each blended with 3 weight percent benzophenone and 2 weight percent triethanolamine as photosensitizers. The separate blends were coated on steel panels and the coatings were irradiated with the predominantly continuum light radiation emanating from a 50 kilowatt argon swirl-flow plasma arc radiation source. Irradiation was carried out for ten seconds at a distance of two feet from the arc source; in all instances the films were cured to solid coatings.

| Coating composition | 1 | 2 | 3 | 4 | 5 | 6 | 7 | 8 |
|---|---|---|---|---|---|---|---|---|
| Resin source, Example 11, Run | A | B | C | D | E | F | G | H |
| Sward hardness, glass=100 | 10 | 20 | 40 | 72 | 14 | 52 | 72 | 16 |
| Reverse impact, in lb. | 165 | 165 | 165 | 50 | 65 | 65 | 100 | 20 |
| Adhesion to steel | E | G | F | P | P | F | F | F |

When Coating Compositions 1 to 8 of Example 20 were cured by irradiation with ultraviolet light from a 500 watt medium pressure mercury arc, a wrinkled, tack-free finish was obtained after a long exposure of from 300 to 400 seconds.

EXAMPLE 21

A solution of the polycaprolactone polyol (163.4 g.) described in Example 8, 2-hydroxyethyl acrylate (107.8 g.), 2-ethoxyethyl acrylate (107.1 g.), and dibutyltin dilaurate (0.1 g.) was placed in a brown bottle. To this solution was fed portionwise methylenedi(4-cyclohexylisocyanate) (260.3 g.) After each incremental addition of the diisocyanate, the bottle was vigorously agitated and cooled in a water bath. The resulting oligomer, which has a Brookfield viscosity of about 30,000 cps. at 23° C., had the basic structure:

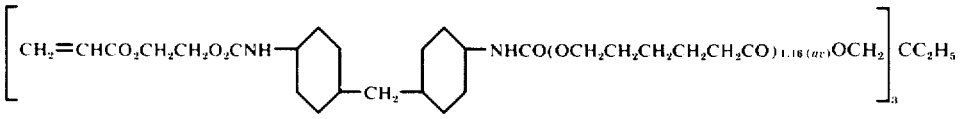

The following procedures were used to test the above compositions.

Sward hardness—Paint Testing Manual issued by Gardner Laboratory, Inc., P.O. Box 5728, Bethesda 14, Md., page 138

Reverse impact test—Same as above, p. 146

Adhesion

CROSSHATCH—Conducted by scribing a film with a sharp knife into 10⅛" squares, pressing scotch tape firmly against the scribed surface at 45° angle to the squares and pulling the tape away with one quick motion. Based on film condition the adhesion is rated: E (no effect—excellent), G (good—slight effect), F fair-most of the film remains on the substrate) and P (poor-tape removes all of the coating from the substrate).

IMPACTED BUMP—Same as crosshatch on impression resulting from the reverse impact test.

BURR EDGE—Consists of shearing film and substrate and conducting a crosshatch test on the unscribed cut-edge.

What is claimed is:

1. Acrylate-capped polycaprolactones comprising compositions from the group consisting of:

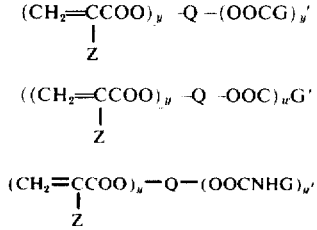

wherein

Z is hydrogen or methyl;

Q is the residue remaining after reaction of the caprolactone polyol with the carboxylic, isocyanato and acrylyl compound;

G is the monovalent residue remaining after reaction of a substituted or unsubstituted monocarboxylic acid or monoisocyanate with the caprolactone polyol and acrylyl compound and is alkyl, aryl, [ alkenyl, ] aralkyl, alkaryl or cycloalkyl having up to about 12 carbon atoms;

G′ is the polyvalent residue remaining after reaction of a substituted or unsubstituted polycarboxylic acid or polyisocyanate with the caprolactone polyol and acrylyl compound and can be a linkage linear or branched alkylene having from 1 to about 10 carbon atoms, or arylene, alkarylene and aralkylene having from 6 to about 12 carbon atoms, cycloalkylene having from 5 to about 10 carbon atoms, and bicycloalkylene having from 7 to about 15 carbon atoms;

R is a linear or branched divalent alkylene having from 2 to about 5 carbon atoms;

X is alkyl having from 1 to about 3 carbon atoms or phenyl;

x is an integer having a value of from 1 to 4;

y is an integer having a value of 1 to 3;

y′ is an integer having a value of 1 to 3;

the sum of y plus y′ is from 2 to 4;

w is an integer equal to the valence of G′and can be from 2 to about 4;

n is an integer having a value of from 1 to about 10; and z is an integer having a value of one.

2. Acrylate-capped polycaprolactone esters as claimed in claim 1 comprising compositions from the group consisting of:

$$((CH_2{=}\underset{\underset{Z}{|}}{C}COO)_y{-}Q{-}OOC)_wG'$$

$$((CH_2{=}\underset{\underset{Z}{|}}{C}CCOO)_y{-}Q{-}OOC)_wG'$$

wherein Z, Q, G, G', x, y, y' and w have the same meanings as defined in claim 1.

3. Acrylate-capped polycaprolactone urethanes as claimed in claim 1, comprising compositions from the group consisting of:

$$(CH_2{=}\underset{\underset{Z}{|}}{C}COO)_y{-}Q{-}(OOCNHG)_{y'}$$

-continued $$((CH_2{=}\underset{\underset{Z}{|}}{C}COO)_y{-}Q{-}OOCNH)_wG'$$

$$(CH_2{=}\underset{\underset{Z}{|}}{C}COOROOCNH{-}G'{-}NHCOO)_{y'}{-}Q$$

wherein Z, Q, G, G', R, y, y', w and x have the same meanings as defined in claim 1.

4. Acrylate-capped polycaprolactone as claimed in in claim 1, comprising compositions of the formula:

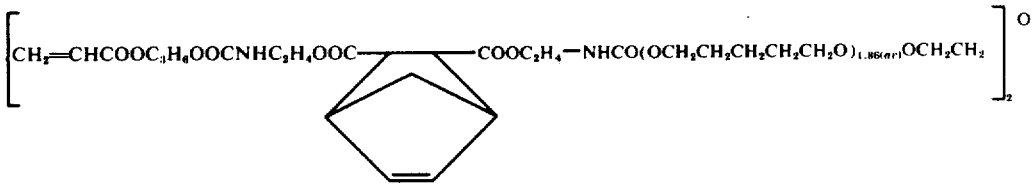

5. Acrylate-capped polycaprolactone as claimed in claim 1, comprising compositions in claim 1, comprising compositions of the formula:

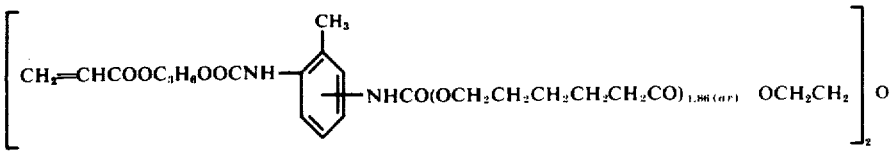

6. Acrylate-capped polycaprolactone as claimed in claim 1, comprising compositions of the formula:

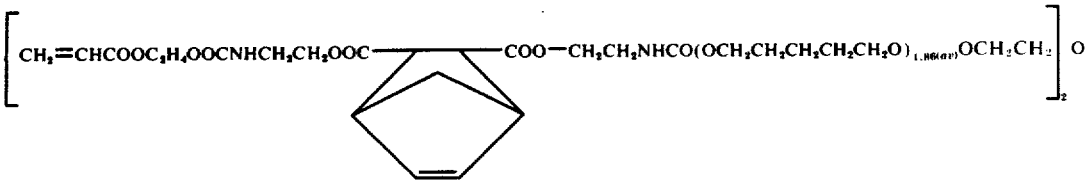

7. Acrylate-capped polycaprolactone as claimed in claim 1, comprising compositions of the formula:

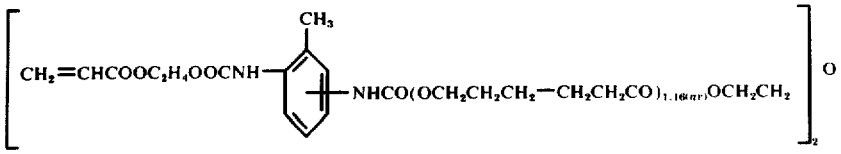

8. Acrylate-capped polycaprolactone as claimed in claim 1, comprising compositions of the formula:

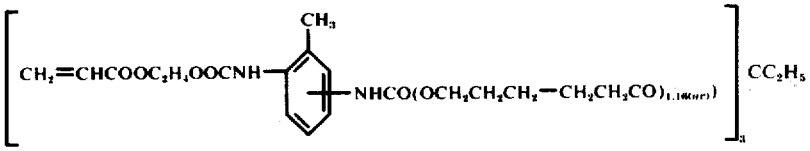
9. Acrylate-capped polycaprolactone as claimed in claim 1, comprising compositions of the formula:
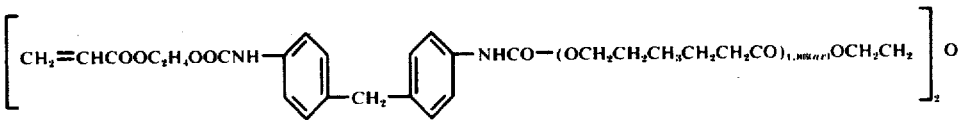
* * * * *